Figure 1:
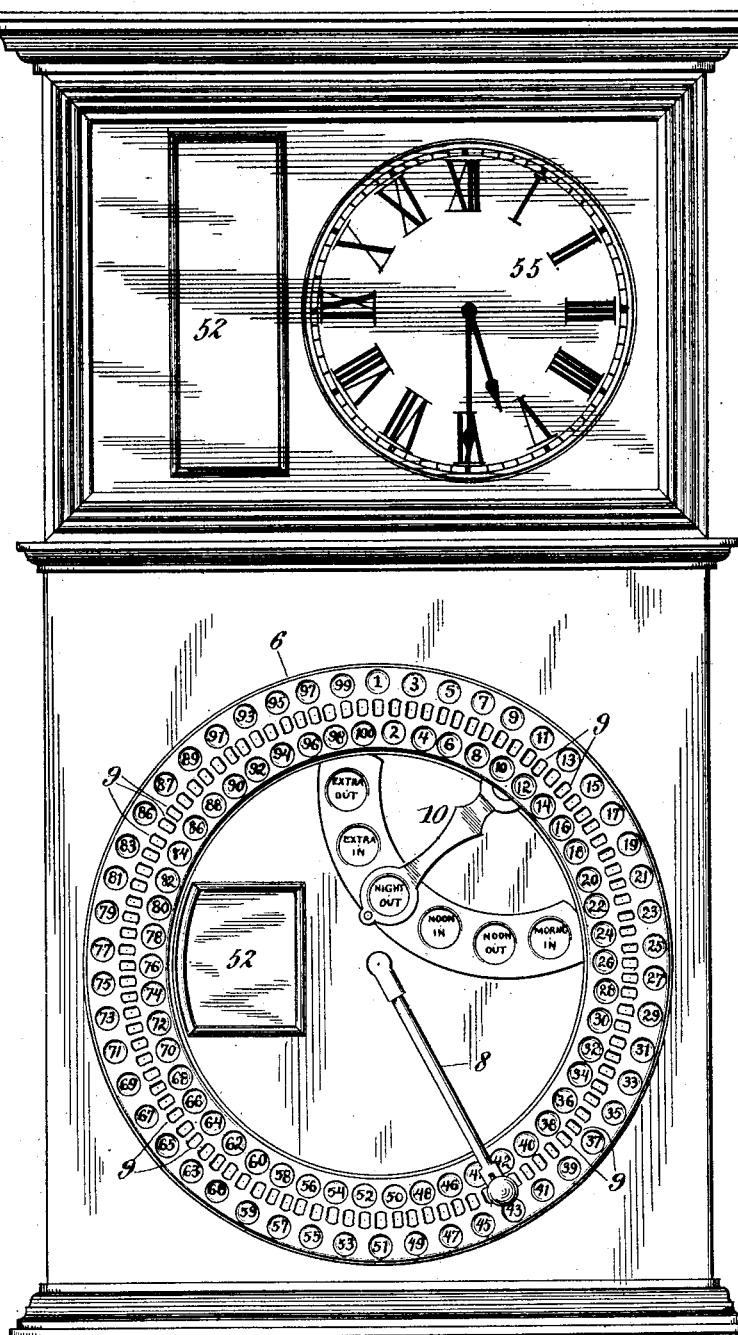

No. 671,127. Patented Apr. 2, 1901.
W. L. BUNDY.
TIME RECORDER.
(Application filed July 12, 1899.)
(No Model.) 7 Sheets—Sheet 1.

WITNESSES: INVENTOR
Willard Le Grand Bundy
BY
Kenyon & Kenyon
ATTORNEYS

No. 671,127. Patented Apr. 2, 1901.
W. L. BUNDY.
TIME RECORDER.
(Application filed July 12, 1899.)
(No Model.) 7 Sheets—Sheet 2.

WITNESSES:
INVENTOR
Willard Le Grand Bundy
BY
Kenyon & Kenyon
ATTORNEYS

No. 671,127. Patented Apr. 2, 1901.
W. L. BUNDY.
TIME RECORDER.
(Application filed July 12, 1899.)
(No Model.) 7 Sheets—Sheet 3.

WITNESSES:

INVENTOR
Willard Le Grand Bundy
BY
Kenyon & Kenyon
ATTORNEYS

THE NORRIS PETERS CO., PHOTO-LITHO., WASHINGTON, D. C.

No. 671,127. Patented Apr. 2, 1901.
W. L. BUNDY.
TIME RECORDER.
(Application filed July 12, 1899.)
(No Model.) 7 Sheets—Sheet 5.

WITNESSES:

INVENTOR
Willard Le
Grand Bundy,
by Kenyon &
Kenyon
ATTORNEYS

No. 671,127. Patented Apr. 2, 1901.
W. L. BUNDY.
TIME RECORDER.
(Application filed July 12, 1899.)
(No Model.) 7 Sheets—Sheet 6.
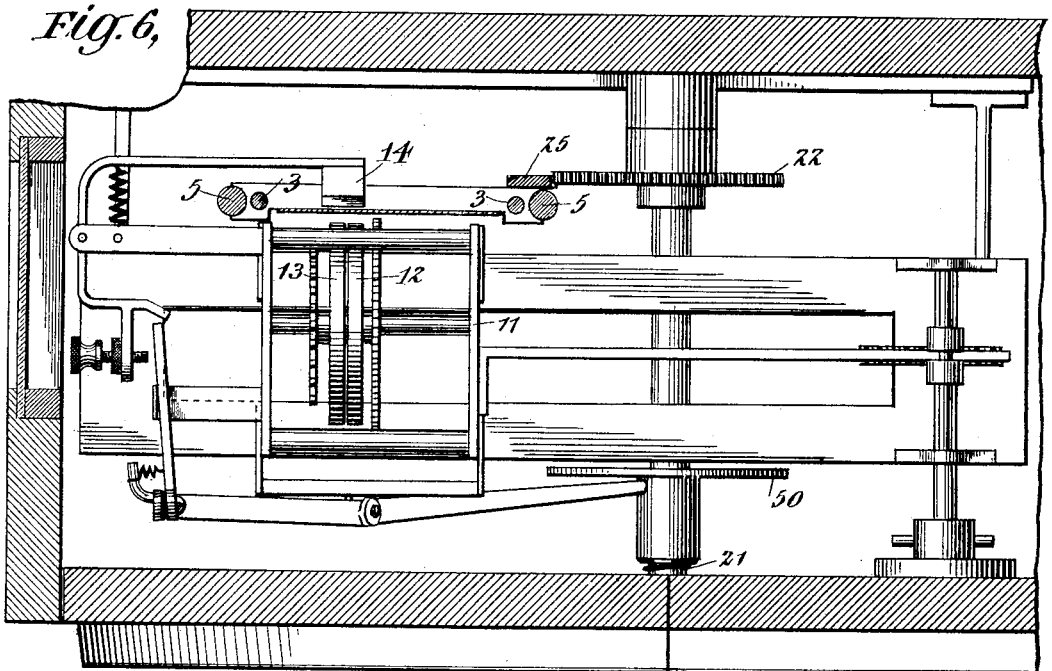
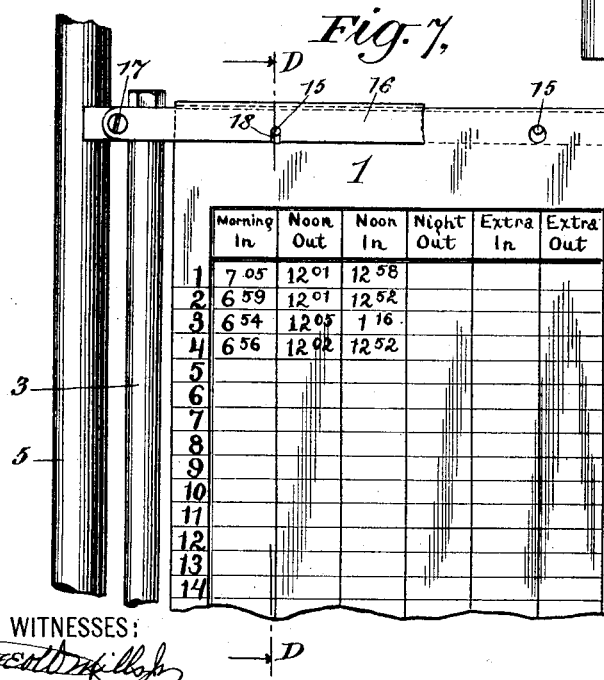
WITNESSES:
INVENTOR
Willard Le Grand Bundy
BY
Kenyon & Kenyon
ATTORNEYS

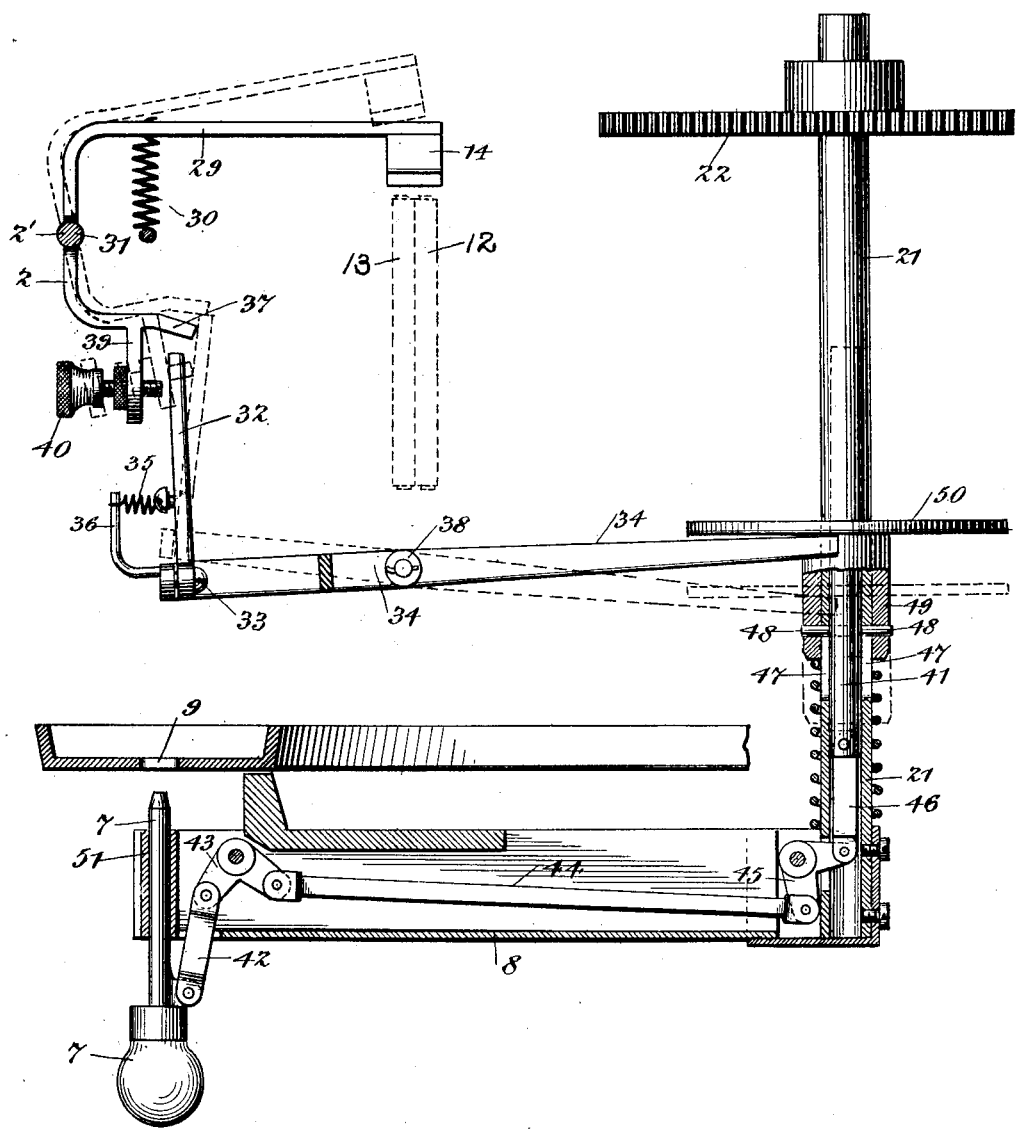

UNITED STATES PATENT OFFICE.

WILLARD L. BUNDY, OF BINGHAMTON, NEW YORK, ASSIGNOR TO THE BUNDY MANUFACTURING COMPANY, OF NEW YORK.

TIME-RECORDER.

SPECIFICATION forming part of Letters Patent No. 671,127, dated April 2, 1901.

Application filed July 12, 1899. Serial No. 723,526. (No model.)

*To all whom it may concern:*

Be it known that I, WILLARD LE GRAND BUNDY, a citizen of the United States, and a resident of Binghamton, in the county of Broome and State of New York, have invented certain new and useful Improvements in Time-Recorders, of which the following is a specification.

My invention relates to time-recorders.

It has for its objects to provide means for printing the time of the operation of the machine—as, for example, upon the arrival and departure of employees—upon a time-strip, in the proper spaces upon the card, so that a plurality of persons can record upon the strip, each in the space reserved for him; also, for printing such records in the proper one of a plurality of spaces designating different divisions of time; also, for readily bringing such time-strip into sight, so that it can be easily inspected; also, to provide improved impression mechanism; also, to improve the means for driving the time-recording wheels synchronously with a clock-movement, and also to insure accurate register in printing upon the time-card.

It consists of the novel devices herein shown and described.

In the drawings accompanying this specification and forming part hereof and in which similar reference characters in the different figures represent corresponding parts I have shown and will now proceed to describe the preferred form or embodiment of my invention.

Figure 2:
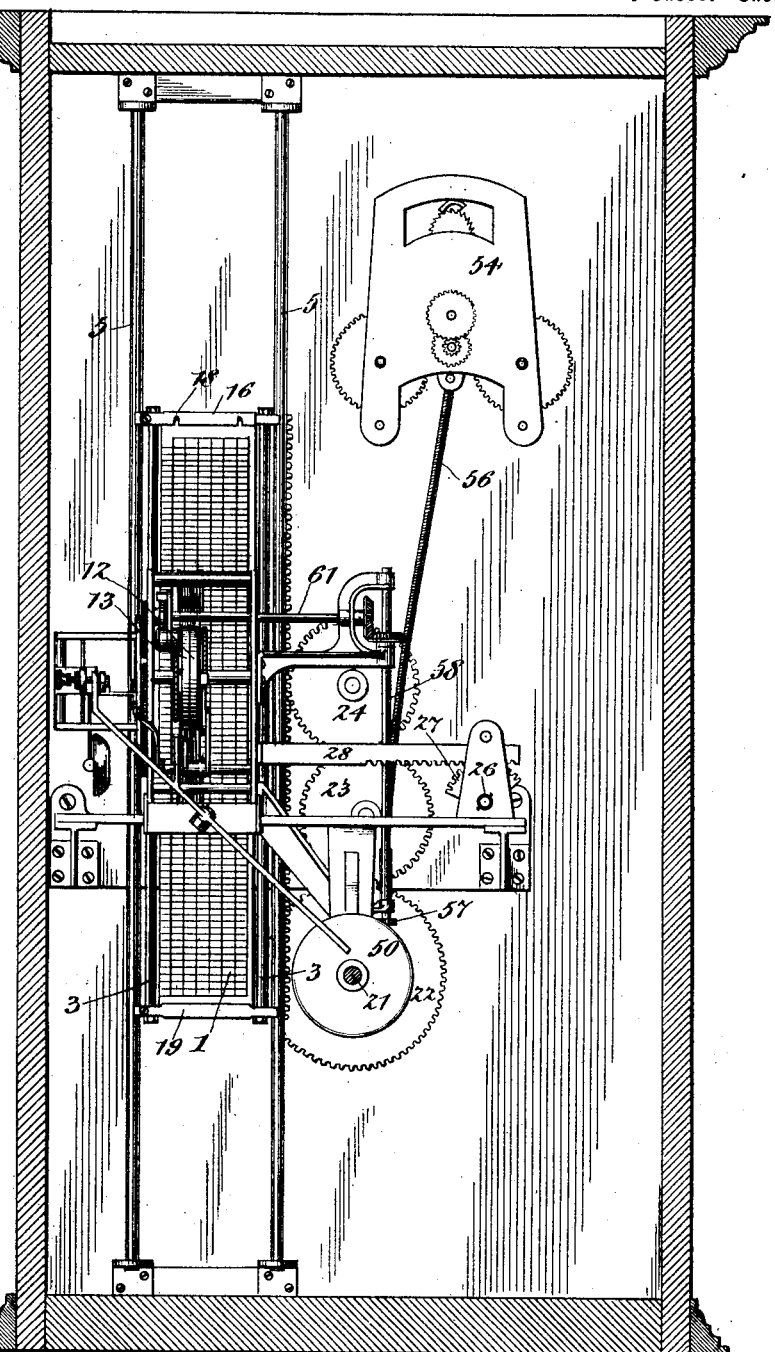
Figure 3:
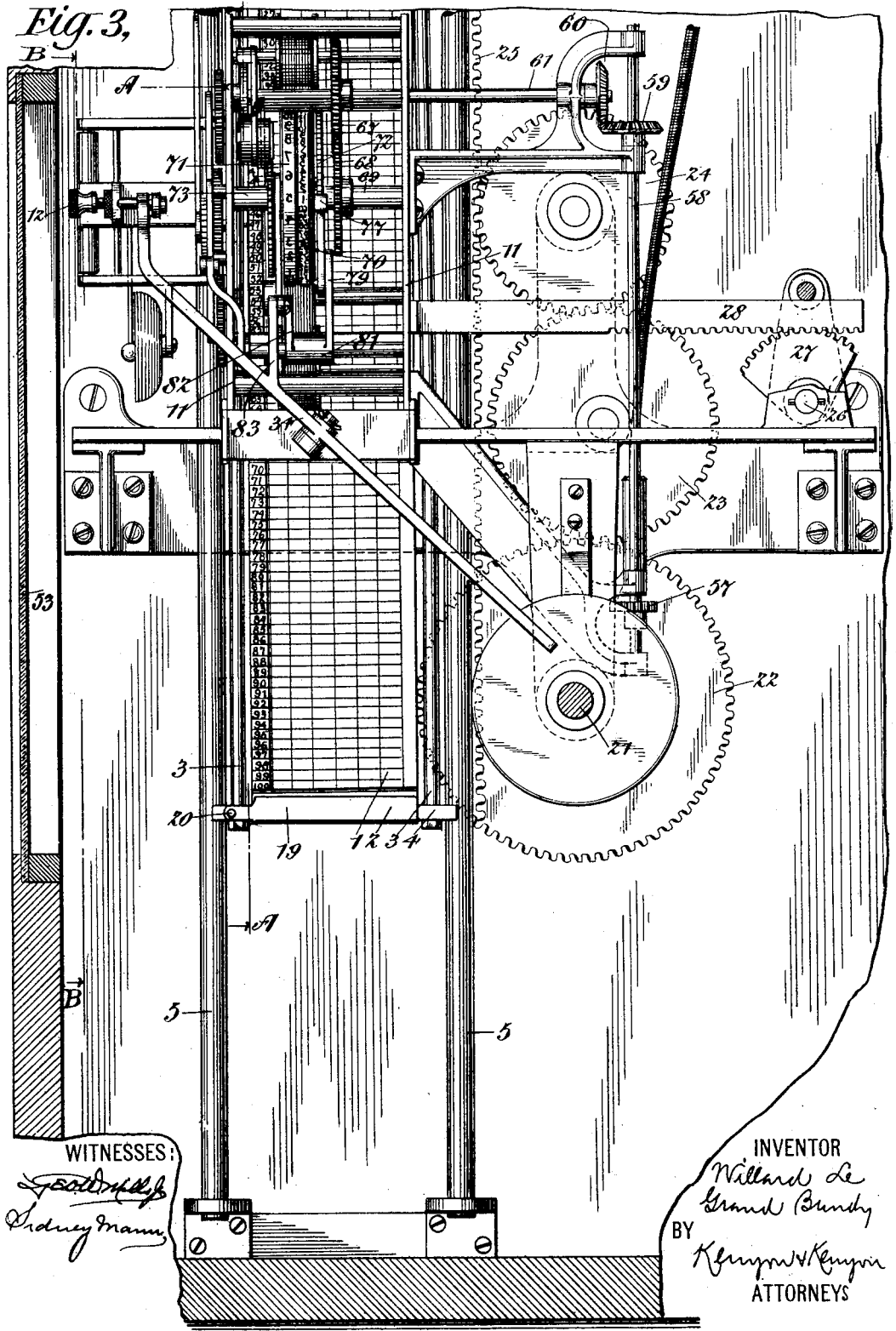
Figure 4:
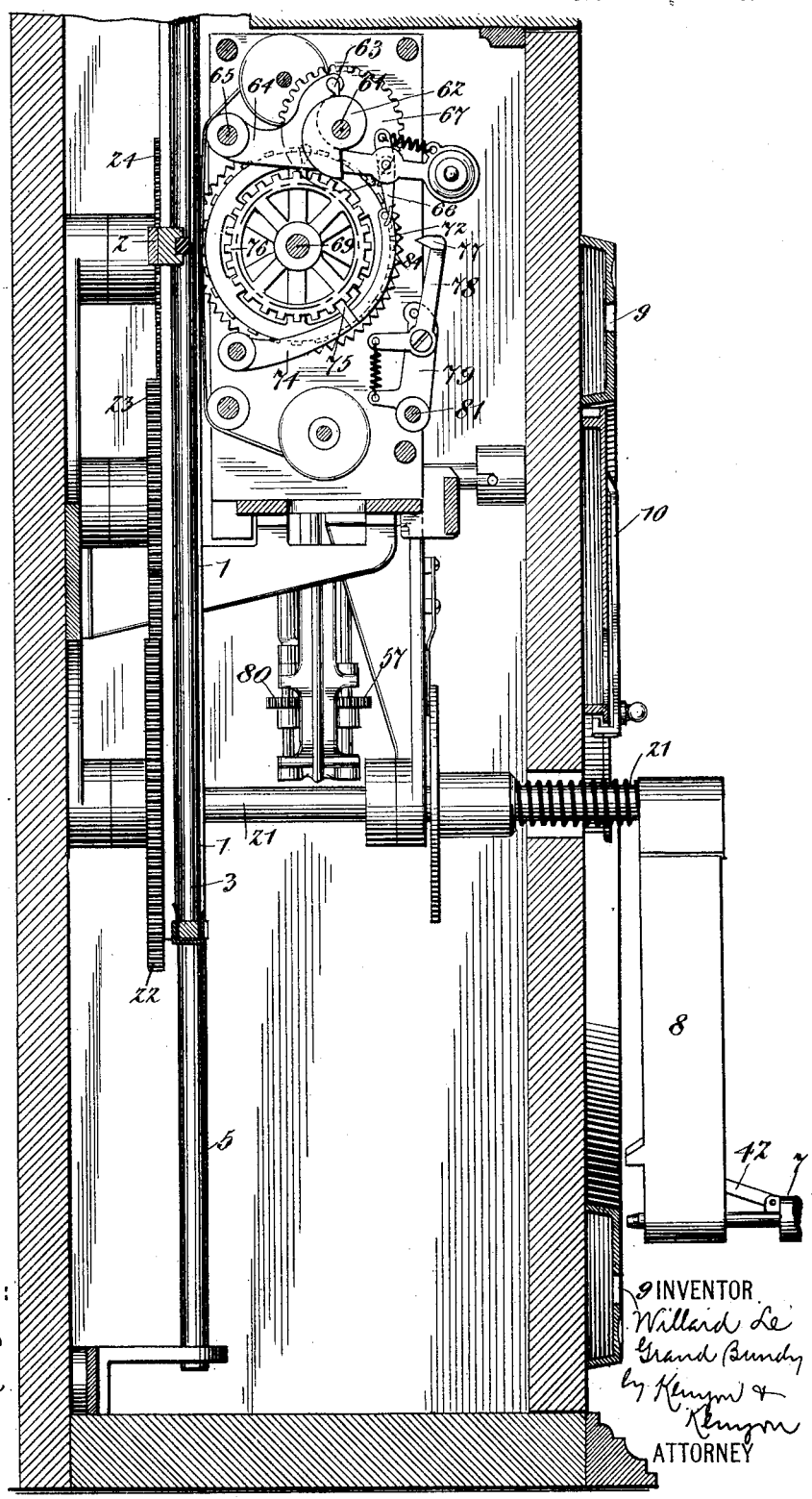
Figure 5:
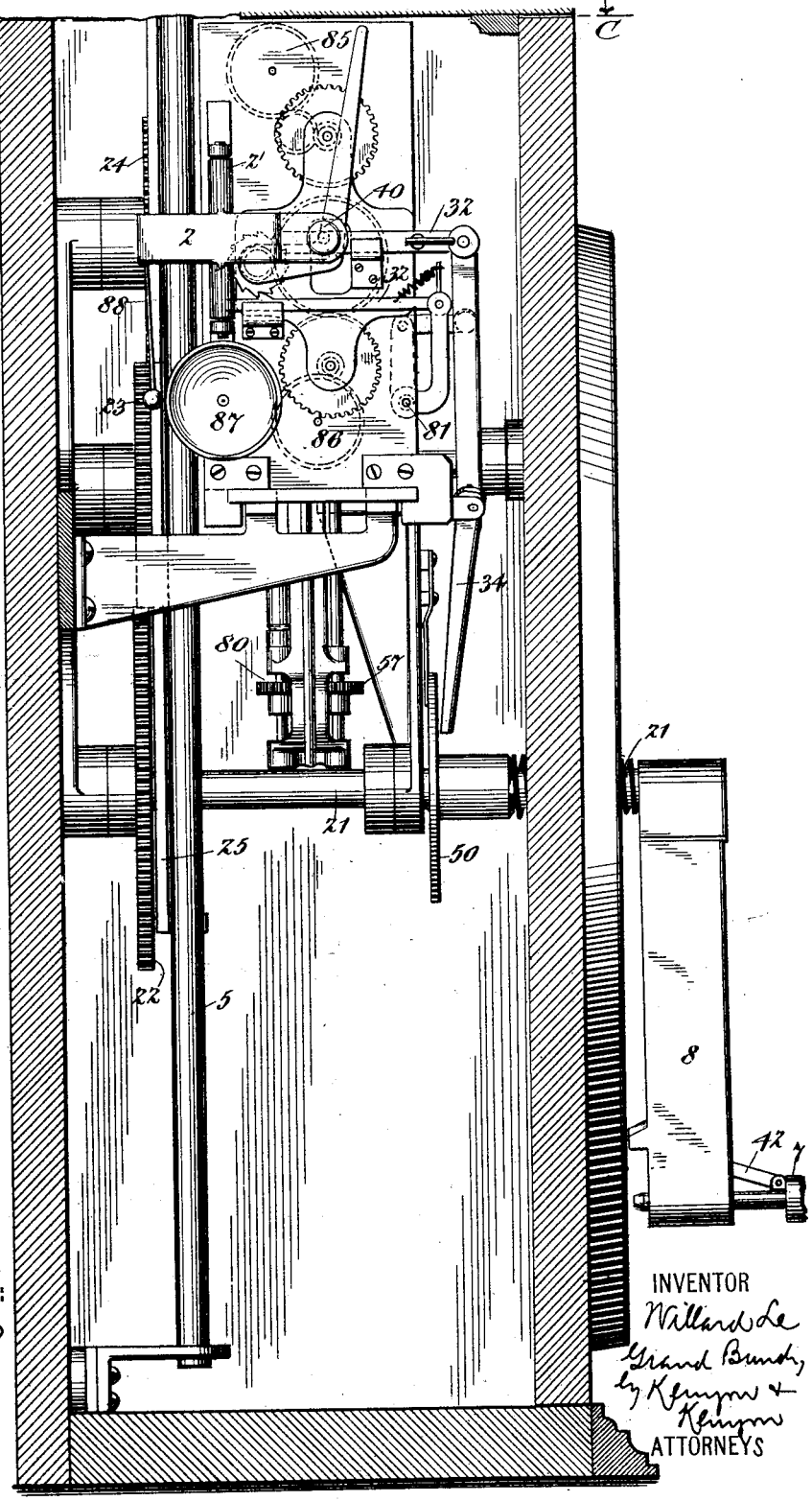

Figure 1 is a front view of a time-recorder embodying my invention. Fig. 2 is a vertical section of the same with the front of the casing removed. Fig. 3 is a similar view, but only of the lower part of what is shown in Fig. 2. Fig. 4 is a vertical section taken on the lines A A of Fig. 3, viewed as shown by the arrow. Fig. 5 is a section taken on the line B B of Fig. 3, viewed as shown by the arrow. Fig. 6 is a horizontal section taken on the lines C C of Fig. 5, viewed as shown by the arrow. Fig. 7 is a detail of a part of a time-strip. Fig. 8 is a section on the lines D D of Fig. 7, viewed as shown by the arrow; and Fig. 9 is a detail of the printing mechanism.

Referring now to the specific embodiment of my invention shown in the drawings, 1 is a time-strip, preferably provided with vertical and horizontal spaces, the horizontal spaces being numbered, as shown in Fig. 7, and each horizontal space being reserved for a particular workman, to whom the number opposite the line is assigned. The vertical spaces are for the purpose of designating different divisions of time, such as "In," "Out," or "Morning," "Noon," or "Night," or for "Extra time." The number of these horizontal and vertical spaces can of course be varied as desired. 2 is a movable frame for carrying or supporting the time-strip. It consists of vertical rods 3 3, one on each side, secured together at their ends by cross-pieces 4 4. Upon these the time-strip is mounted, as will be presently described. Movable frame 2 is adapted to move up and down on supports 5, secured to the framework of the machine, the ends of cross-pieces 4 4 being preferably curved to bear against supports 5.

6 is a dial-index on the front face of the machine, provided with a pointer 7, mounted upon a swinging arm 8. The dial is provided with any desired number of openings 9 9, each of which bears a number upon the dial, as shown in Fig. 1. By turning the pointer opposite to any opening 9 the operator, through mechanism presently to be described, moves the movable frame upward or downward. The mechanism is so constructed that as the operator brings the pointer opposite to any opening the horizontal space bearing the corresponding number to that of the said opening 9 is brought upon the printing-line.

By means of swinging arm 10 the operator moves a movable carriage 11, which carries the hour and minute recording-wheels 12 and 13 and also the impression-platen 14 and certain other parts of the impression mechanism transversely across the face of the time-strip, so as to bring the time-recording wheels and impression-platen opposite to any one of the vertical spaces or columns upon the time-strip. The mechanism by which this is accomplished will be presently described. Thus by moving the swinging arms 8 and 10 a record of the time of the operation of the machine can be made in any appropriate space upon the time-strip.

The time-strips can be secured in any desired manner to the movable frames. As shown, I place pins 15 15 in the stationary part of the upper cross-piece 4, and I make openings in the time-strips through which pins 15 15 may project. These openings are accurately and exactly placed in the time-strips, so that every time-strip will occupy exactly the same position upon the movable frame as every other time-strip. After a time-strip has been placed in position the clamp 16, which is pivoted at 17 to upper piece 4, is brought down. This clamp has notches 18 cut out in its lower edge to fit over pins 15. The time-strip is then pulled downward over the lower piece 4, and clamp 19, pivoted at 20, is then moved up over it to firmly clamp or lock the time-strip in position. By these means the time-strips are locked in accurate and related position upon the movable frame.

The means for moving the movable frame in one direction or the other along supports 5, as shown in the drawings, consists of the following mechanism: Arm 8 is fixedly mounted upon a shaft 21. Upon the other end of the shaft is a gear-wheel 22, which meshes with gear-wheel 23, mounted in the framework of the machine, the latter meshing with gear 24. Gear 24 meshes with rack 25, secured to frame 2. As the pointer is swung around the dial the movable frame is moved up or down. Gear 23 is preferably made very wide, as shown in Fig. 5, so as to permit gear 22 to be of large size and yet go to one side of the movable frame and yet have gear 24 mesh with rack 25.

Means for moving the carriage transversely are as follows: Upon the shaft 26 of arm 10 is mounted a toothed sector 27. (Shown in Fig. 2.) The sector meshes with rack 28, the latter being secured at its end to one side of the movable carriage. As arm 10 is swung from one position to another it moves the movable frame transversely across the face of the time-strip and brings the time-recording wheels and impression-platen, which are mounted upon the movable carriage, opposite the desired vertical column of the time-strip.

The impression mechanism is under the control of the operator. As shown, it consists of the following devices: Platen 14 is mounted upon a spring-pressed lever 29. Spring 30 tends to press the platen against the type of the hour and minute recording wheels, as shown in Fig. 9. Lever 29 is fulcrumed at 31 in the framework of the movable carriage. 32 is an arm pivoted at 33 to lever 34. A spring 35, secured to an extension 36 of lever 34, tends to pull arm 32 to the left, as shown in Fig. 9, or in position to cause arm 32 to engage against the part 37 of lever 29 or the opposite end of the lever from that upon which the platen is mounted. When lever 34 is rocked upon its fulcrum 38 into the position shown by dotted lines in Fig. 9, arm 32 engages with part 37 of lever 29, forcing platen 14 away from the time-recording wheels and straining spring 30 until arm 32 slips out of engagement with part 37 of lever 29. The means for forcing it out of engagement consists of a finger 39, projecting from part 37 of lever 29. A set-screw 40 projects through this finger. Finger 39 and set-screw 40 form a projection the bearing-point of which—namely, the end of the set-screw—is farther away from fulcrum 31 than is the end of part 37. Accordingly as arm 32 forces 37 upward the point of set-screw 40 moves more rapidly to the right than does part 37 of the lever, and at a certain point the set-screw forces arm 32 out of engagement with part 37, permitting spring 30 to cause platen 14 to deliver a sharp blow upon the type of the time-recording wheels. By means of the adjustment of the set-screw the point of disengagement can be varied, thus varying the intensity of the blow. Lever 29 37 forms a spring-pressed support whenever lever 34 is rocked in order to deliver a blow against the time-recording wheels to print the record desired.

Lever 34 is rocked by means of the following-described mechanism: Shaft 21 is made hollow, as shown in Fig. 9, and in it is placed a rod 41, which is adapted to slide freely inside of the hollow shaft. Pointer 7 and rod 41 are connected by arm 42, bell-crank 43, rod 44, bell-crank 45, mounted and moving in arm 8, and 46, pivoted to bell-crank 45 and to rod 41 and moving inside of hollow shaft 21. 47 is a slot in shaft 21, and 48 is a pin projecting through the slot and rigidly connecting rod 41 with a sleeve 49, surrounding the hollow shaft and free to move thereon. Upon sleeve 49 is mounted a disk 50. Pointer 7 is loosely mounted in a groove 51 in arm 8. When the pointer is shoved inward, its inner end passes through one of the openings 9 of the dial, and as it is shoved inward rod 41 is pulled forward through the lever connections above described, carrying with it sleeve 49 and disk 50. Disk 50 is arranged so as to engage with one end of lever 34, no matter in what position upon the dial the pointer may be. Accordingly whenever the pointer is pushed into an opening 9 the impression mechanism is actuated and a record is made.

In order to permit an examination of the time-strip at any time to ascertain, for example, whether a particular workman has entered or left the factory or when he entered or left, I arrange one or more openings in the casing of the machine, so that the records upon the time-strip can be brought into position to be seen through the opening. For this purpose I provide windows 52 52 in the front of the casing, and also for the purpose of giving additional light I preferably provide a window 53 in the side of the casing, as shown in Fig.

3. By means of my improved mechanism the records can be inspected at any time.

54 represents a clock-movement, of which 55 is a clock-face. This movement may be of any suitable construction.

56 is a flexible shaft connected with the clock-movement and rotated by it and which imparts motion to the hour and minute recording wheels by mechanism presently to be described. In order to make this mechanism connecting the clock-movement with the time-recording wheels sufficiently elastic to permit the temporary stoppage of the time-recording wheels for printing purposes without affecting the clock-movement, I preferably make the flexible shaft 56 as long as possible and carry it down toward the lower end of the mechanism, where it is provided with a gear-wheel 80. This gear-wheel meshes with gear-wheel 57 on shaft 58, the latter carrying at its upper end beveled gear 59, meshing with beveled gear 60 on shaft 61. Shaft 61 carries gear 67, meshing with gear 68 on shaft 69. This shaft carries minute-wheel 70, also mounted on shaft 69. Motion is imparted to hour-wheel 71 from shaft 61 by means of cam 62 on shaft 61, fork-lever 64, having toe 63, bearing upon cam 62 at the end of one fork and spring-pressed pawl 66 upon the other arm, the pawl engaging with the teeth of the ratchet-wheel 72, mounted upon sleeve 73 upon shaft 69, hour-wheel 71 being also fixedly mounted upon said sleeve. The vibratory motion of lever 64 causes the hour-wheel to be fed forward at each revolution of cam 62. A spring-pressed lever 74, having a tooth 75, meshing with ratchet-wheel 76, secured to the hour-wheel, keeps the hour-wheel locked in position, except at each forward movement of pawl 66, the pawl at that time engaging with locking-lever 74 and temporarily removing it from engagement with ratchet-wheel 76. These means form no part of the present invention and will not be further described.

During the printing operation I preferably lock the minute-wheel in position by means of tooth 77, mounted on lever 78, pivoted to lever 79, carried by shaft 81. This shaft is secured by a link 82 to a branch arm 83 of lever 34. Each time lever 34 is moved by disk 50 to deliver a printing blow tooth 77 is forced into engagement with the teeth of gear-wheel 84, which is fixedly mounted upon the shaft of the minute-wheel, thus holding the minute-wheel rigidly during the printing operation.

Any suitable mechanism for feeding the inking-ribbon may be employed.

85 86 are the ink-ribbon rolls.

Mechanism for feeding the ink-ribbon forms no part of the present invention and will therefore not be further described; but it is preferably actuated by the operator during the printing operation.

87 is a bell, and 88 an arm provided with a hammer for ringing the bell. Arm 88 is connected to lever 34, as shown in Fig. 3. Each time the lever is moved to give a printing blow the hammer will strike the bell when the printing blow is given.

What I claim as new, and desire to secure by Letters Patent, is—

1. In a time-recorder the combination of a movable frame for supporting a time-strip, vertical supports for said frame up and down which the frame is adapted to move in order to bring upon the printing-line different places upon the strip assigned to different operators, means, under the control of the operator, for moving said frame up and down the supports for bringing upon the printing-line the place upon the strip assigned to the operator, time-recording wheels driven synchronously by a clock-movement, impression mechanism and means, under the control of the operator, for actuating it, whereby the operator may cause the time of the operation of the machine to be printed upon the strip in a space reserved for him.

2. In a time-recorder the combination of a movable frame for supporting a time-strip provided with vertical and horizontal spaces arranged to receive the record of a plurality of operators and to designate different divisions of time, vertical supports for said frame up and down which the frame is adapted to move in order to bring upon the printing-line different spaces upon the strip assigned to different operators, means, under the control of the operator, for moving said frame up and down the supports for bringing upon the printing-line the place upon the strip assigned to the operator, a movable carriage, time-recording wheels mounted upon the carriage, impression mechanism, means, under the control of the operator, for actuating the impression mechanism in any and all positions of the carriage, and means for moving the carriage transversely across the face of the time-strip, whereby the operator may cause the time of the operation of the machine to be printed upon the strip in a space reserved for him and appropriate to the proper division of time.

3. In a time-recorder the combination of a movable frame for supporting a time-strip provided with vertical and horizontal spaces arranged to receive the record of a plurality of operators and to designate different divisions of time, vertical supports for said frame up and down which the frame is adapted to move in order to bring upon the printing-line different spaces upon the strip assigned to different operators, means, under the control of the operator, for moving said frame up and down the supports for bringing upon the printing-line the place upon the strip assigned to the operator, a movable carriage, time-recording wheels driven synchronously by a clock-movement, impression mechanism, both mounted upon the carriage, means, under the control of the operator, for actuating the impression mechanism in any and all positions of the carriage, and means for moving the carriage transversely across the face of the time-strip, whereby the operator may cause the time of the operation of the machine to be printed upon the strip in a space reserved for him and appropriate to the proper division of time.

4. In a time-recorder having a casing provided with an opening the combination with time-recording wheels driven synchronously by a clock-movement, impression mechanism and means, under the control of the operator, for actuating it, of a movable frame for supporting a time-strip, vertical supports for said frame up and down which the frame is adapted to move in order to bring upon the printing-line different places upon the strip assigned to different operators, means, under the control of the operator, for moving said frame up and down the supports, whereby records upon the time-card can be brought into position to be seen through the opening.

5. In a time-recorder having a casing provided with an opening the combination with time-recording wheels driven synchronously by a clock-movement, impression mechanism, of a movable frame for supporting a time-strip provided with vertical and horizontal spaces arranged to receive the record of a plurality of operators and to designate different divisions of time, vertical supports for said frame up and down which the frame is adapted to move in order to bring upon the printing-line different places upon the strip assigned to different operators, means under the control of the operator, for moving said frame up and down the supports, a movable carriage upon which the time-recording wheels and impression mechanism are mounted, means, under the control of the operator, for actuating the impression mechanism in any and all positions of the carriage, and means for moving the carriage transversely across the face of the time-strip, and whereby records can be made upon different parts of the time-strip and whereby records upon the time-strip can be brought into position to be seen through the opening.

6. In a time-recorder the combination of a movable frame for supporting a time-strip, vertical supports for said frame up and down which the frame is adapted to move in order to bring upon the printing-line different spaces upon the strip assigned to different operators, an index arranged on the casing of the time-recorder, a pointer adapted to be moved over the index to register with any mark thereon, connections between the pointer and the time-strip whereby motion will be imparted to the frame and strip vertically up or down the supports as the pointer is moved in one direction or the other, time-recording wheels driven synchronously by a clock-movement, impression mechanism and means for actuating it, whereby the operator may cause the time of the operation of the machine to be printed upon the strip in a space reserved for him.

7. In a time-recorder the combination of a time-strip, a movable frame for supporting the time-strip, vertical supports for said frame up and down which the frame is adapted to move in order to bring upon the printing-line different spaces upon the strip assigned to different operators, an index arranged on the casing of the time-recorder, a pointer adapted to be moved over the index to register with any mark thereon, connections between the pointer and the time-strip including a train of gearing so arranged that the movement of the pointer from one mark on the index to the adjacent mark will cause the strip to move vertically so as to bring upon the printing-line the next adjacent space thereon, time-recording wheels driven synchronously by a clock-movement, impression mechanism and means for actuating it, whereby the operator may cause the time of the operation of the machine to be printed upon the strip in a space reserved for him.

8. In a time-recorder the combination of time-recording wheels driven synchronously with a clock-movement, suitable inking devices, an impression-platen mounted upon a spring-pressed support, an arm adapted to engage with a part of the platen-support to press the platen away from the time-recording wheels, a spring for holding said arm in position to engage with the platen-support, a projection from the spring-pressed support extending farther from the fulcrum of said support than the part of said support with which the arm engages, and adapted at some point in the movement of the parts to cause the arm to slip off from such engagement, and means, under the control of the operator, for moving said arm, whereby the impression-platen may be caused to deliver a blow against the time-recording wheels to print the record desired.

9. In a time-recorder the combination of time-recording wheels driven synchronously with a clock-movement, suitable inking devices, an impression-platen mounted upon one end of a spring-pressed lever, an arm adapted to engage with the other end of said lever to press the platen away from the time-recording wheels, a spring for holding said arm in position to engage with the platen-lever, a projection from its spring-pressed lever extending farther from the fulcrum of said lever than the part of said lever with which the arm engages, and adapted at some point in the movement of the parts to cause the arm to slip off from such engagement, and means, under the control of the operator, for moving said arm, whereby the impression-platen may be caused to deliver a blow against the time-recording wheels to print the record desired.

10. In a time-recorder the combination of time-recording wheels driven synchronously with a clock-movement, suitable inking devices, an impression-platen mounted upon one end of a spring-pressed lever, an arm pivoted to a support therefor and adapted to engage with the other end of said lever to press the platen away from the time-recording wheels, a spring for holding said arm in position to engage with the platen-lever, a projection from the part of the lever, against which said arm is adapted to press, extending farther from the fulcrum of said lever than the part of said lever with which said arm engages, and adapted at some point in the movement of the parts to cause said arm to slip off from such engagement, and means, under the control of the operator, for moving the support for said arm, whereby the impression-platen may be caused to deliver a blow against the time-recording wheels to print the record desired.

11. In a time-recorder the combination of time-recording wheels driven synchronously with a clock-movement, suitable inking devices, an impression-platen mounted upon one end of a spring-pressed lever, an arm pivoted to a support therefor and adapted to engage with the other end of said lever to press the platen away from the time-recording wheels, a spring for holding said arm in position to engage with the platen-lever, a finger projecting from the part of the lever, against which said arm is adapted to press, an adjustable set-screw mounted in said finger, said finger and set-screw together extending farther from the fulcrum of said lever than the part of said lever with which said arm engages, the end of the set-screw being adapted at some point in the movement of the parts to cause said arm to slip off from such engagement, and means, under the control of the operator, for moving the support for said arm, whereby the impression-platen may be caused to deliver a blow against the time-recording wheels to print the record desired.

12. In a time-recorder the combination of time-recording wheels driven synchronously with a clock-movement, suitable inking devices, an impression-platen mounted upon a spring-pressed support, an arm adapted to engage with the platen-support to press the platen away from the time-recording wheels, a spring for holding said arm in position to engage with the platen-support, means for causing said arm to slip off from such engagement, a movable frame for supporting a time-strip, supports for said frame along which it is adapted to move, a dial-index arranged on the casing of the time-recorder, a pointer adapted to be moved over the index to register with any mark thereon, a swinging arm carrying the pointer mounted upon a hollow shaft, a rod, adapted to slide freely inside of the hollow shaft, lever connections between the pointer and said rod whereby when the pointer moves inward or outward the rod will slide one way or the other inside of the hollow shaft, a sleeve surrounding the hollow shaft and free to move thereon, a slot in the hollow shaft, a pin projecting through the slot rigidly connecting the rod and sleeve, a disk secured to the sleeve, and connections between the disk and the arm which engages with the platen-support, whereby the impression-platen may be caused to deliver a blow against the time-recording wheels to print the record desired.

13. In a time-recorder the combination of time-recording wheels driven synchronously with a clock-movement, suitable inking devices, an impression-platen mounted upon one end of a spring-pressed lever, an arm pivoted to a support therefor and adapted to engage with the other end of said lever to press the platen away from the time-recording wheels, a spring for holding said arm in position to engage with the platen-lever, a movable frame for supporting a time-strip, supports for said frame along which it is adapted to move, a dial-index arranged on the casing of the time-recorder, a pointer adapted to be moved over the index to register with any mark thereon, a swinging arm carrying the pointer mounted upon a hollow shaft, a rod adapted to slide freely inside of the hollow shaft, lever connections between the pointer and said rod, whereby when the pointer moves inward or outward the rod will slide one way or the other inside of the hollow shaft, a sleeve surrounding the hollow shaft and free to move thereon, a slot in the hollow shaft, a pin projecting through the slot rigidly connecting the rod and sleeve, a disk secured to the sleeve, and connections between the disk and the arm which engages with the platen-lever, whereby the impression-platen may be caused to deliver a blow against the time-recording wheels to print the record desired.

14. In a time-recorder the combination of time-recording wheels driven synchronously with a clock-movement, suitable inking devices, an impression-platen mounted upon one end of a spring-pressed lever, an arm pivoted to a support therefor and adapted to engage with the other end of said lever to press the platen away from the time-recording wheels, a spring for holding said arm in position to engage with the platen-lever, a finger projecting from the part of the lever, against which said arm is adapted to press, an adjustable set-screw mounted in said finger, said finger and set-screw together extending farther from the fulcrum of said lever than the part of said lever with which said arm engages, the end of the set-screw being adapted at some point in the movement of the parts to cause said arm to slip off from such engagement, a movable frame for supporting a time-strip, supports for said frame along which it is adapted to move, a dial-index arranged on the casing of the time-recorder, a pointer adapted to be moved over the index to register with any mark thereon, a swinging arm carrying the pointer mounted upon a hollow shaft, a rod adapted to slide freely inside of the hollow shaft, lever connections between the pointer and said rod whereby when the pointer moves inward or outward the rod will slide one way or the other inside of the hollow shaft, a sleeve surrounding the hollow shaft and free to move thereon, a slot in the hollow shaft, a pin projecting through the slot rigidly connecting the rod and sleeve, a disk secured to the sleeve, and connections between the disk and the arm which engages with the platen-lever, whereby the impression-platen may be caused to deliver a blow against the time-recording wheels to print the record desired.

15. In a time-recorder the combination of a movable frame for supporting a time-strip, provided with vertical and horizontal spaces arranged to receive the record of a plurality of operators and to designate the different divisions of time, supports for said frame along which it is adapted to move, a dial-index arranged on the casing of the time-recorder, a pointer adapted to be moved over the index to register with any mark thereon, a swinging arm carrying the pointer mounted upon a hollow shaft, a rod adapted to slide freely inside of the hollow shaft, lever connections between the pointer and said rod whereby when the pointer moves inward or outward the rod will slide one way or the other inside of the hollow shaft, a sleeve surrounding the hollow shaft and free to move thereon, a slot in the hollow shaft, a pin projecting through the slot rigidly connecting the rod and sleeve, a disk secured to the sleeve, and connections between the disk and the arm which engages with the platen-support, a movable carriage adapted to carry the impression-platen and the time-recording wheels, time-recording wheels driven synchronously with a clock-movement, means for moving the carriage transversely across the face of the time-strip, whereby the operator may cause the time of the operation of the machine to be printed upon the strip in a space reserved for him and appropriate to the proper division of time.

16. In a time-recorder the combination of a movable frame for supporting time-strips, pins thereon adapted to take into openings accurately and exactly placed in the time-strips, means for locking the strips in accurate and related position upon the movable frame, vertical supports for said frame up and down which the frame is adapted to move in order to bring upon the printing-line different places upon the strip assigned to different operators, means, under the control of the operator, for moving said frame up and down the supports for accurately and exactly bringing upon the printing-line the place upon the strip assigned to the operator, time-recording wheels driven synchronously by a clock-movement, impression mechanism and means, under the control of the operator, for actuating it, whereby the operator may cause the time of the operation of the machine to be printed upon the strip exactly in the space reserved for said operator.

17. In a time-recorder the combination with time-recording wheels driven synchronously with a clock-movement, of an impression-platen mounted upon a spring-support, a member adapted to engage with the platen-support to press the platen in a direction away from the time-recording wheels, means for holding said member normally in position to engage with the platen-support, a projection from the platen-support extending farther from the fulcrum of said support than the part of said support with which the said member engages and adapted at some point in the movement of the parts to cause the member to slip off from engagement with the platen-support, and means, under the control of the operator, for moving said member, whereby the impression-platen may be caused to deliver a blow against the time-recording wheels to print the record desired.

In testimony whereof I have signed my name to this specification in the presence of two subscribing witnesses.

WILLARD L. BUNDY.

Witnesses:
   ALEX. CUMMING,
   ASA J. CUMMING.